United States Patent
Hester et al.

(10) Patent No.: US 8,985,840 B2
(45) Date of Patent: Mar. 24, 2015

(54) MIXING APPARATUS FOR CONTINUOUS PRODUCTION OF MONOMER EMULSION

(75) Inventors: Kenneth W. Hester, Gambsheim (FR); Daniel R. Stanley, Bentley, MI (US); Mark S. Riddle, Midland, MI (US); Mark A. Greschaw, Midland, MI (US); Dennis D. Hacker, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 1128 days.

(21) Appl. No.: 12/737,237

(22) PCT Filed: Jun. 24, 2009

(86) PCT No.: PCT/US2009/003753
§ 371 (c)(1),
(2), (4) Date: Dec. 21, 2010

(87) PCT Pub. No.: WO2010/008470
PCT Pub. Date: Jan. 21, 2010

(65) Prior Publication Data
US 2011/0160340 A1    Jun. 30, 2011

Related U.S. Application Data

(60) Provisional application No. 61/133,530, filed on Jun. 30, 2008.

(51) Int. Cl.
*B01F 15/02* (2006.01)
*B01F 3/08* (2006.01)
(Continued)

(52) U.S. Cl.
CPC ............. *B01F 3/0807* (2013.01); *B01F 5/0451* (2013.01); *B01F 7/00758* (2013.01); *C08F 2/01* (2013.01); *C08F 2/22* (2013.01); *B01F 3/0811* (2013.01)
USPC ................... 366/172.1; 366/172.2; 366/178.3

(58) Field of Classification Search
CPC ........ B01F 5/045; B01F 5/046; B01F 5/0683; B01F 5/0684
USPC ........... 366/168.1, 172.1, 172.2, 178.1, 178.3
See application file for complete search history.

(56) References Cited

U.S. PATENT DOCUMENTS

| 3,744,763 | A  | 7/1973 | Schnöring et al. |
| 6,271,320 | B1 | 8/2001 | Keller et al.    |

(Continued)

FOREIGN PATENT DOCUMENTS

| DE | 3123743  | 3/1982  |
| DE | 19916053 | 10/2000 |

(Continued)

OTHER PUBLICATIONS

Heike P. Schuchmann, et al.,"Emulsification: more than just comminution", Chemie Ingenieur Technik, 2004, vol. 76, No. 4, 25 pages.

(Continued)

*Primary Examiner* — Charles Cooley
*Assistant Examiner* — Marc C Howell
(74) *Attorney, Agent, or Firm* — Brooks, Cameron & Huebsch, PLLC

(57) ABSTRACT

Mixing apparatus and methods for the continuous production of monomer emulsions that may be used in the production of polymer dispersions by radical aqueous emulsion polymerization. The mixing apparatus can include a pipe-in-pipe injector (100) and a suitable rotor-stator mixer (102). Liquids are delivered to the rotor-stator mixer via an inner (110) and an outer (108) pipe in such a way as to substantially prevent feed inconsistencies in a feed ratio of the liquids prior to entering a mixing zone of the rotor-stator mixer for emulsion formation.

7 Claims, 2 Drawing Sheets

(51) Int. Cl.
*B01F 5/04* (2006.01)
*B01F 7/00* (2006.01)
*C08F 2/01* (2006.01)
*C08F 2/22* (2006.01)

(56) References Cited

U.S. PATENT DOCUMENTS

| | | | |
|---|---|---|---|
| 6,946,529 | B2 | 9/2005 | Keller et al. |
| 2008/0080304 | A1* | 4/2008 | Sakamoto et al. ......... 366/165.3 |
| 2008/0221267 | A1* | 9/2008 | Venkatesh ..................... 524/854 |

FOREIGN PATENT DOCUMENTS

| | | |
|---|---|---|
| GB | 2442340 | 2/2008 |
| JP | S630227875 | 9/1988 |
| JP | 1236926 | 9/1989 |
| JP | 03131603 | 6/1991 |
| JP | 3131603 | 6/1991 |

OTHER PUBLICATIONS

International Search Report & Written Opinion from related PCT Application No. PCT/US2009/003753 dated Feb. 23, 2010. (21 pages).
Taylor, Mike A., "Synthesis of Polymer Dispersions", Polymer Dispersions and Their Industrial Applications, 2002, pp. 15-40, (26 pages).
Greerco, "Pipeline Mixer", Bulletin 122, 2004, 4 pages.
Victor A. Atiemo-Obeng, Richard V. Calabrese, "Rotor-Stator Mixing Devices", Handbook of Industrial Mixing: Science and Practice, 2004, Chapter 8, pp. 479-505, (27 pages), John Wiley & Sons, Inc.
Fabien Barailler, et al., "CFD analysis of a rotor-stator mixer with viscous fluids", Chemical Engineering Science, vol. 61, Jan. 4, 2006, pp. 2888-2891, (7 pages).
M.R. Baker, "Droplet Breakup Using In-Line Mixers Located in Recirculation Loops Around Batch Vessels", Chemical Engineering Science, vol. 48, No. 22, Jun. 1, 1993, pp. 3829-3833, (5 pages).
J.T. Davies, "Drop Sizes of Emulsions Related to Turbulent Energy Dissipation Rates", 1985, Chemical Engineering Science, vol. 40, No. 5, pp. 839-842, (4 pages).

Edward Kostansek, "Emulsions", Kirk-Othmer Encyclopedia of Chemical Technology, Jul. 18, 2003, vol. 10, pp. 113-133, (21 pages), copyright John Wiley & Sons, Inc.
Helmar Schubert, et al., "Product Engineering of Dispersed Systems", Trends in Food Science & Technology, vol. 14, 2003, pp. 9-16, (8 pages).
Irja Piirma, Shih-R. Chen, "Adsorption of Ionic Surfactants on Latex Particles", Journal of Colloid and Interface Science, vol. 74, No. 1, Mar. 1980, pp. 90-102, (13 pages).
Keltoum Ouzineb, et al., "Homogenisation Devices for the Production of Miniemulsions", Chemical Engineering Science, vol. 61, 2006, pp. 2994-3000, (7 pages).
Michael Stang, et al., "Adsorption kinetics of emulsifiers at oil-water interfaces and their effect on mechanical emulsification", Chemical Engineering and Processing, vol. 33, 1994, pp. 307-311, (5 pages).
S.-Y. Lin, et al "Determination of adsorption of an ionic surfactant on latex from surface tension measurements", Colloids and Surfaces, A: Physicochemical and Engineering Aspects, vol. 196, 2002, pp. 189-198, (10 pages).
Michael Grady, "Latex Technology", Kirk-Othmer Encyclopedia of Chemical Technology, Sep. 17, 2004, vol. 14, pp. 1-22, (22 pages), copyright John Wiley & Sons, Inc.
Kai Urban, et al., "Rotor-Stator and Disc Systems for Emulsification Processes", Chemical Engineering Technology, 2006, vol. 29, No. 1, pp. 24-31, (8 pages).
D.P. Durbin, et al., "Influence of Monomer Preemulsification on Formation of Particles from Monomer Drops in Emulsion Polymerization", Journal of Applied Polymer Science, 1979, vol. 24, pp. 703-707, (5 pages), John Wiley & Sons, Inc.
Heike P. Schuchmann, et al.,"Emulgieren: Mehr als nur Zerkleinern", Chemie Ingenieur Technik, 2004, vol. 76, No. 4, 12 pages.
Heike P. Schuchmann, et al., "Product Design in Food Industry Using the Example of Emulsification", Eng. Life Sci. 2003, pp. 67-75, (10 pages).
"Inline Emulsion formation using IPM and FDM Mixing Technologies", Maelstrom Advanced Process Technologies Ltd., 2004, 3 pages, accessed via: http://www.maelstrom-apt.com/Technologies_Appnote1_1v3.htm.

* cited by examiner

MIXING APPARATUS FOR CONTINUOUS PRODUCTION OF MONOMER EMULSION

This application is a National Stage application under 35 U.S.C. 371 of PCT/US2009/003753, filed on Jun. 24, 2009 and published as WO 2010/008470 on Jan. 21, 2010, which claims priority in part from U.S. Provisional Application Ser. No. 61/133,530 filed Jun. 30, 2008, the entire content of which is incorporated herein by reference.

FIELD OF DISCLOSURE

The present disclosure generally relates to mixing apparatus and methods of their use, and in particular to mixing apparatus for the continuous production of an emulsion.

BACKGROUND

Polymers are used in a variety of applications such as adhesives, paints, paper coatings and textile coatings. Many of these polymers are manufactured using a process called emulsion polymerization.

Emulsion polymerization is a type of radical polymerization that usually starts with an emulsion of water, monomer and emulsifier. In general, the formation of an emulsion follows two steps. First, at least two components that include immiscible liquid phases are pre-mixed. Generally, this pre-mixing occurs in the presence of a suitable amount of one or more emulsifiers in order to create droplets of a dispersed liquid phase in another continuous liquid phase. Second, the droplets resulting from this pre-mixing step are disrupted by shear forces that result in a more stable emulsion of much smaller droplets.

The pre-mixing step, however, adds equipment costs to the emulsification polymerization process, increases the hold up of the reactive monomer mixtures, can add downtime and associated costs to the process, and affects the precision of the reactive monomer mixture feed to the polymerization reactor by increasing residence time throughout the emulsification system.

Therefore, it is desirable to have simplified apparatuses and methods for the production of monomer emulsions used in emulsion polymerization processes.

SUMMARY

The present disclosure provides embodiments of a mixing apparatus that includes a pipe-in-pipe injector and a rotor-stator mixer. For the various embodiments, the pipe-in-pipe injector includes an inner pipe with an outlet end positioned at a predetermined distance from a leading surface of a rotor of the rotor-stator mixer to allow the formation of an emulsion from two or more immiscible liquids delivered to the rotor-stator mixer from the pipe-in-pipe injector. For the various embodiments, the predetermined distance allows the pipe-in-pipe injector to provide a steady stream of phase separated liquids at a substantially constant feed ratio and at a uniform feed rate to a mixing zone of the rotor-stator mixer. Surprisingly, a stable monomer emulsion can be continuously produced with the mixing apparatus of the present disclosure without need of upstream mixing or a pre-mixing step, as was previously required.

For the various embodiments, the rotor-stator mixer of the mixing apparatus has a rotor having a leading surface, a liquid inlet and a mixing zone. For the various embodiments, the pipe-in-pipe injector has an inner pipe and an outer pipe that at least partially surrounds the inner pipe, where both pipes have an end portion and an outlet end. As discussed herein, the leading surface of the rotor is an initial point, physical or imaginary, encountered on the rotor along a central axis that extends from the lumen of the inner pipe toward the rotor. For the various embodiments, the inner pipe has an inner diameter, where the outlet end of the inner pipe can be positioned at a predetermined distance of about 1.5 to about 0.5 times the inner diameter of the inner pipe away from the leading surface of the rotor.

For the various embodiments, the end portions provided by the inner pipe and the outer pipe of the pipe-in-pipe injector extend in a common direction. In one embodiment, the outer pipe has an inlet portion and the inner pipe extends away from the inlet portion beyond the end portion and the outlet end of the outer pipe. For the various embodiments, the pipe-in-pipe injector can be connected to the liquid inlet of the rotor-stator mixer with the outlet end of the inner pipe being positioned at the predetermined distance from the leading surface of the rotor of the rotor-stator mixer. In additional embodiments, the end portions of the inner pipe and the outer pipe can be concentric or eccentric.

The present disclosure also provides methods of forming a monomer emulsion that may be used in a continuous polymerization process. The disclosed methods can include supplying a first liquid at a first mass flow rate to the rotor-stator mixer; supplying a second liquid to the rotor-stator mixer at a second mass flow rate that is about fifty percent a final mass flow rate for the second liquid, where the second liquid is immiscible with the first liquid and at least one of the first liquid and the second liquid contains monomers; increasing the second mass flow rate of the second liquid from about fifty percent the final mass flow rate to the final mass flow rate over a predetermined time interval; and providing a residence time sufficient for the first liquid and the second liquid in the rotor-stator mixer to form the continuous monomer emulsion from the first liquid and the second liquid.

For the various embodiments, the first liquid and the second liquid can have different density values. Some disclosed embodiments provide that the liquid having the greater density is supplied to the rotor-stator mixer via the inner pipe of the pipe-in-pipe injector and the liquid having the lesser density is supplied to the rotor-stator mixer via the outer pipe of the pipe-in-pipe injector. For example, in an embodiment where the first liquid has a first density and the second liquid has a second density that is less than the first density, the first liquid is supplied as a continuous stream via the inner pipe with the second liquid supplied from the outer pipe surrounding the continuous stream of the first liquid.

In additional embodiments, supplying the first liquid and the second liquid to the rotor-stator mixer is done in such a way as to substantially prevent a feed inconsistency, as defined herein, in a feed ratio of the first liquid and the second liquid prior to entering the mixing zone of the rotor-stator mixer. As discussed herein, the pipe-in-pipe injector helps to substantially prevent feed inconsistencies in the immiscible liquids by keeping the first liquid separate from the second liquid until the predetermined distance of about 1.5 to about 0.5 times the inner diameter of the inner pipe away from the leading surface of the rotor.

Embodiments of the present disclosure further include methods of producing a continuous monomer emulsion for a polymerization process. For the various embodiments, the method includes supplying the first liquid through the inner pipe of the pipe-in-pipe injector having its outlet end positioned at the predetermined distance from the leading surface of the rotor of the rotor-stator mixer; supplying the second liquid through the outer pipe of the pipe-in-pipe injector to the rotor-stator mixer, where at least one of the first liquid and the second liquid contains monomers and the first liquid emerges from the inner pipe surrounded by and flowing in a direction common with the second liquid from the outer pipe; and continuously forming an emulsion from the first liquid and the second liquid in the mixing zone of the rotor-stator mixer. For the various embodiments, the immiscible liquids can be supplied to the mixing zone at a substantially constant feed ratio of a mass flow rate for the second liquid to a mass flow rate for the first liquid. For the various embodiments, the substantially constant feed ratio of the mass flow rate for the second liquid to the mass flow rate of the first liquid can be at least 3 to 1. Other values for the substantially constant feed ratio of the mass flow rate for the second liquid to the mass flow rate for the first liquid include, but are not limited to, at least 5 to 1 and about 13.5 to 1.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DEFINITIONS

Figure 1:
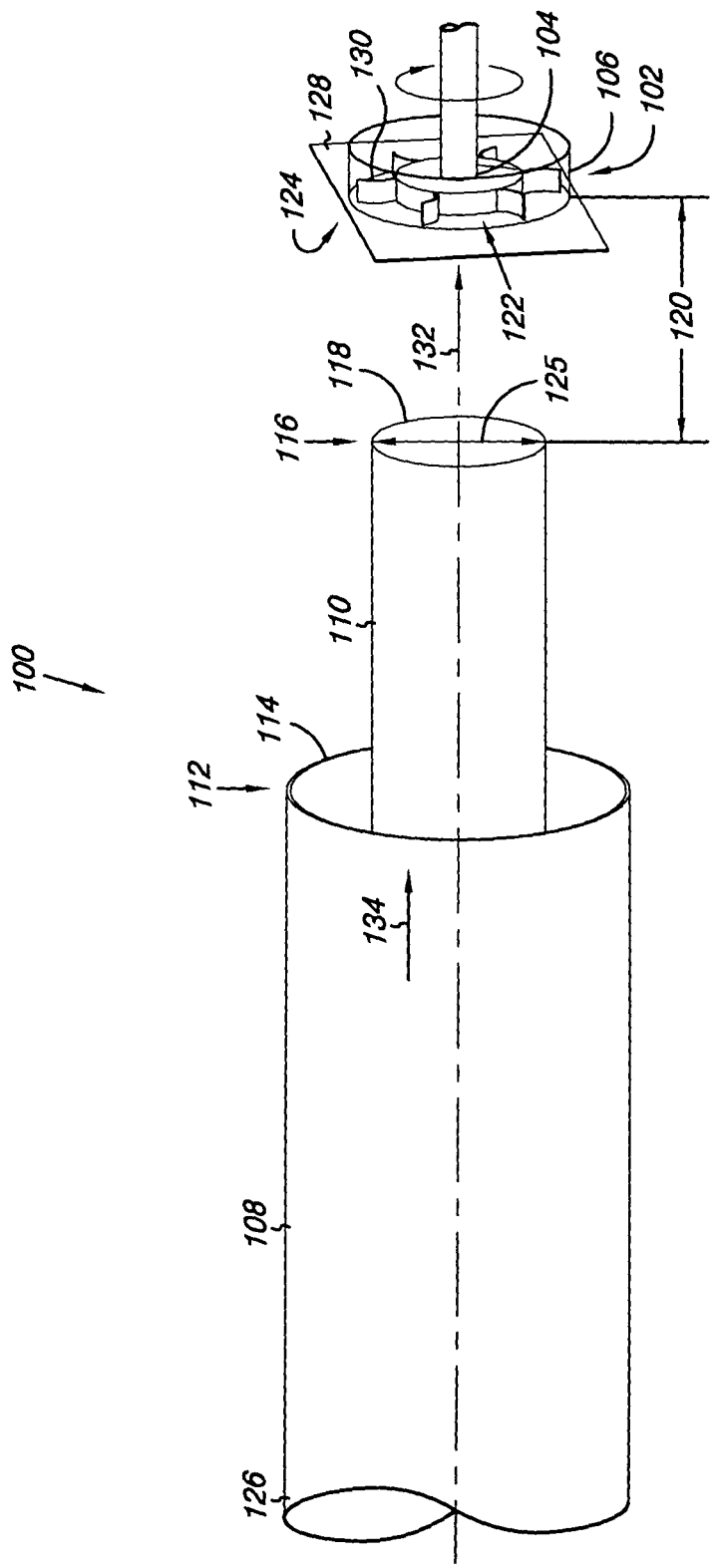
FIG. 1 illustrates components of a mixing apparatus according to an embodiment of the present disclosure.

As used herein, "a," "an," "the," "at least one," and "one or more" are used interchangeably. The terms "includes" and "comprises" and variations thereof do not have a limiting meaning where these terms appear in the description and claims. Thus, for example, a mixing apparatus that includes "a" rotor can be interpreted to mean that the mixing apparatus includes "one or more" rotors.

As used herein, "inner diameter" means a distance between two points on an inner surface defining a lumen of the inner pipe taken along a straight line passing perpendicularly through a central axis of the lumen.

As used herein, "leading surface" of the rotor of the rotor-stator mixer is defined as an initial point, physical or imaginary, encountered on the rotor along a central axis extending from the lumen of the inner pipe toward the rotor.

As used herein, a "feed inconsistency" means a fluctuation or instability in a feed ratio of the continuous phases of immiscible liquids entering a mixing zone of a rotor-stator mixer that leads to difficulties in establishing and/or re-establishing a steady state emulsion product from the rotor-stator mixer. As used herein, "feed inconsistency" and "feed inconsistencies" are used interchangably.

As used herein, "mixing zone" means a volume in which agitation (or energy) is provided by the movement of a part, such as a rotor of a rotor-stator mixer.

As used herein, "emulsion" means a mixture of two or more immiscible liquids held in suspension and having a stability sufficient for a predetermined purpose.

As used herein, "and/or" means one, one or more, or all of the listed elements.

Also herein, the recitations of numerical ranges by endpoints include all numbers subsumed within that range (e.g., 1 to 5 includes 1, 1.5, 2, 2.75, 3, 3.80, 4, 5, etc.).

DETAILED DESCRIPTION

The Figures herein follow a numbering convention in which the first digit or digits correspond to the drawing Figure number and the remaining digits identify an element or component in the drawing. Similar elements or components between different Figures may be identified by the use of similar digits. For example, 110 may reference element "10" in FIG. 1, and a similar element may be referenced as 210 in FIG. 2. As will be appreciated, elements shown in the various embodiments herein may be added, exchanged, and/or eliminated to provide any number of additional embodiments. In addition, as will be appreciated the proportion and the relative scale of the elements provided in the figures are intended to illustrate the embodiments of the present invention, and should not be taken in a limiting sense.

The present disclosure provides embodiments that include a mixing apparatus, methods of forming a monomer emulsion for a continuous, semi-continuous, or batch polymerization process using the mixing apparatus, and/or methods of continuous, semi-continuous, or batch monomer emulsion production for a polymerization process using the mixing apparatus. An example of such a polymerization process includes, but is not limited to, the production of a polymer dispersion by radical aqueous emulsion polymerization.

FIG. 1 illustrates components of a mixing apparatus according to one embodiment of the present disclosure. As illustrated, components of the mixing apparatus include a pipe-in-pipe injector 100 and a rotor-stator mixer 102 having an rotor 104 and a stator 106. The rotor 104 may also be referred to as an impeller.

For the various embodiments, the pipe-in-pipe injector 100 includes an outer pipe 108 and an inner pipe 110, where the outer pipe 108 at least partially surrounds the inner pipe 110. As illustrated, the outer pipe 108 includes an end portion 112 with an outlet end 114, and the inner pipe 110 includes an end portion 116 with an outlet end 118.

For the various embodiments, the outlet end 118 of the inner pipe 110 is positioned at a predetermined distance 120 from a leading surface 122 of the rotor 104 of the rotor-stator mixer 102. In one embodiment, the predetermined distance 120 is a length along which immiscible liquids provided from the pipe-in-pipe injector 100 (e.g., an organic liquid from outer pipe 108 and an aqueous liquid from the inner pipe 110, where the two liquids are immiscible) maintain contact, phase separation and a substantially constant feed ratio prior to entering a mixing zone 124 of the rotor-stator mixer 102.

Surprisingly, it has been found that for the embodiments of the present disclosure allowing the immiscible liquids to be in contact for more than the predetermined distance 120 from the leading surface 122 of the rotor 104, as discussed herein, leads to feed inconsistencies with the immiscible liquids, which actually inhibits the formation of an emulsion in the rotor-stator mixer 102. For the various embodiments, positioning the outlet end 118 of the inner pipe 110 at the predetermined distance from the leading surface of the rotor 104 helps prevent feed inconsistencies with the immiscible liquids, thus allowing for the formation of an emulsion from two or more immiscible liquids delivered to the rotor-stator mixer 102 from the pipe-in-pipe injector 100.

While not wishing to be bound by theory, it is believed that allowing the immiscible liquids to be in contact for more than the predetermined distance 120 results in a "feed inconsistency" or "feed inconsistencies" of the immiscible liquids that inhibits the formation of an emulsion in the rotor-stator mixer 102. When a feed inconsistency occurs there can be fluctuations or instability in a feed ratio of the continuous phases of the immiscible liquids entering the mixing zone 124. In other words, feed inconsistencies can lead to a non-steady state feed ratio of the immiscible liquids entering the mixing zone 124. Due to the short residence times in the mixing zone 124, fluctuations or instability in the feed ratio can result in a momentary purge, or lack, of one of the immiscible liquids in the mixing zone 124. Once this happens, it can be difficult to establish or re-establish a steady state emulsion product from the rotor-stator mixer 102, regardless of the rotor speed and/or a liquid back-pressure of the flow from the rotor-stator mixer 102. In other words, a "feed inconsistency" or "feed inconsistencies" can lead to inconsistent feed ratios of the immiscible liquids in the mixing zone 124, which results in difficulty in forming and/or maintaining an emulsion.

Previous approaches to minimizing fluctuations or inconsistency in the feed ratio and/or the feed rate of immiscible liquids have included a pre-mixing step that is used to form a "coarse" pre-dispersion of the immiscible liquids upstream of the rotor-stator mixer. Forming the "coarse" pre-dispersion was an attempt to reduce and/or dampen the fluctuations in the feed ratio and/or the feed rate of the immiscible liquids, and thus minimizing the chances that there would be momentary purge of one of the immiscible liquids in the mixing zone. Use of this pre-mixing step, however, requires additional mixing equipment and leads to increases in residence time for the immiscible liquids in the system resulting in greater hold-up of the emulsion as well as less precise material dosing to the polymerization reactor.

Embodiments of the present disclosure, however, provide a different approach to ensuring a substantially constant feed ratio of the immiscible liquids at a uniform feed rate to the rotor-stator mixer 102, without the need of a pre-mixing step. According to the various embodiments, the pipe-in-pipe injector 100 allows for a substantially constant feed ratio of the immiscible liquids to be supplied to the mixing zone 124 of the rotor-stator mixer 102 at a uniform feed rate, where the immiscible liquids do not undergo pre-mixing as would be found in the pre-mixing step discussed herein. For the various embodiments, positioning the outlet end 118 of the inner pipe 110 of the pipe-in-pipe injector 100 at the predetermined distance 120 from the leading surface 122 of the rotor 104 helps prevent feed inconsistencies in the immiscible liquids prior to entering the mixing zone 124 of the rotor-stator mixer 102. As such, according to the embodiments of the present disclosure mixing of the immiscible liquids occurs directly in the mixing zone 124 of the rotor-stator mixer 102.

For the various embodiments, it is recognized that a preferred value for the predetermined distance 120 can depend upon a number of different process parameters and configurations for the mixing apparatus of the present disclosure. For example, the contact time of the immiscible liquids in contact along the predetermined distance 120 can be a function of the respective mass flow rates. If the mass flow rate for one or both of the immiscible liquids is too slow for the given predetermined distance 120, feed inconsistencies in the immiscible liquids can occur prior to entering the mixing zone 124. Likewise, if the predetermined distance 120 is too long for the given mass flow rates of the immiscible liquids, feed inconsistencies in the immiscible liquids can also occur prior to entering the mixing zone 124.

As appreciated, the mass flow rates of the immiscible liquids used to form the emulsion, and the mass flow rate of the subsequent polymer dispersion formed during the polymerization reaction, can also be a function of the heat transfer rate capabilities of the reactor in which the polymerization reaction is taking place. Therefore, given the heat transfer rate capabilities of the reactor the desired mass flow rates for the immiscible liquids can be determined. These mass flow rates can then be used to determine the volumetric flow rates of the immiscible liquids required to produce the desired polymer dispersion.

The mass flow rates can then be used along with the cross-sectional area of each of the outer pipe 108 and the inner pipe 110 and the length of the predetermined distance 120 to better ensure that the contact time of the immiscible liquids in contact along the predetermined distance 120 is sufficiently short so as to substantially prevent feed inconsistencies in the immiscible liquids prior to entering the mixing zone 124. As will be appreciated, determining the mass flow rates of the immiscible liquids and the subsequent determination of the contact time the immiscible liquids along the predetermined distance 120 may need to be performed on a case-by-case basis for given immiscible liquids used in forming the emulsion for the polymerization reaction.

For the various embodiments, the predetermined distance 120 can be about 1.5 to about 0.5 times an inner diameter 125 of the inner pipe 110 away from the leading surface 122 of the rotor 104. So, in an embodiment where the inner diameter 125 of the inner pipe 110 is about 2.50 cm (i.e., about 1 inch) the predetermined distance 120 can be about 2.50 cm. It is appreciated, however, that the value for the predetermined distance 120 may be different than the one recited herein depending upon the different process parameters, configurations for the mixing apparatus of the present disclosure, and/or the composition of the immiscible liquids used to form the emulsion, among other factors. So, for example, it is possible that the predetermined distance 120 can be greater than about 1.5 and/or less than about 0.5 times the inner diameter 125 of the inner pipe 110 away from the leading surface 122 of the rotor.

In some embodiments, to achieve the predetermined distance 120 relative the leading surface 122 of the rotor 104 the inner pipe 110 extends away from an inlet portion 126 of outer pipe 108 and beyond the outlet end 114 of the outer pipe 108. Such arrangements provide that the outlet end 118 of the inner pipe 110 is nearer to the leading surface 122 of the rotor 104 than is the outlet end 114 of the outer pipe 108. This allows the inner pipe 110 to extend into a liquid inlet of the rotor-stator mixer 102 to position the outlet end 118 of the inner pipe 110 at the predetermined distance 120 from the leading surface 122 of the rotor 104. In an alternative embodiment, the outlet end 114 and the outlet end 118 may be essentially an equal distance (i.e., essentially co-planar) from the leading surface 122 of the rotor 104 when it is provided that the outlet end 114 and the outlet end 118 are both at the predetermined distance 120 or less from the leading surface 122 of the rotor 104.

FIG. 1 further provides an illustration of the leading surface 122 of the rotor 104 and the mixing zone 124 of the rotor-stator mixer 102. For the various embodiments, the mixing zone 124 is a region in which energy from the rotor-stator mixer 102 is imparted to the liquids supplied from the pipe-in-pipe injector 100, as will be discussed herein. In one embodiment, energy from the rotor-stator mixer 102 can be imparted to the liquids in the mixing zone 124 by movement of the rotor 104 in conjunction with the stator 106. For the various embodiments, energy supplied in the mixing zone 124 causes the two or more immiscible liquids to form an emulsion.

For the embodiments discussed herein, the volume defining the mixing zone 124 can be bordered by the leading surface 122 and rotor vanes 130 of the rotor 104 along with a plane 128 that includes points on the rotor-stator mixer 102 that are nearest to the outlet end 118 of the inner pipe 110. For example, the points of the rotor 104 used to define the plane 128 for the mixing zone 124 can be portions of rotor vanes 130 that are positioned closest to the outlet end 118 of the inner pipe 110 as taken along a central axis 132. In an alternative embodiment, the mixing zone 124 can be at least partially defined by the plane 128 that includes points on the stator 106 that are nearest to the outlet end 118 of the inner pipe 110 taken along the central axis 132. For the various embodiments, the plane 128 helping to define the mixing zone 124 can be essentially perpendicular to the central axis 132.

For the various embodiments, the end portions 112 and 116 of the outer pipe 108 and the inner pipe 110, respectively, both extend in a common direction 134. In one embodiment, the common direction 134 is towards the leading surface 122 of the rotor 104, where the direction of liquid flow emerging from both the end portions 112 and 116 is essentially in the common direction 134. For the various embodiments, the common direction 134 for the liquid flow can be parallel with the central axis 132. In the various embodiments, providing the common direction 134 to the liquid flow can be accomplished by each of the outer pipe 108 and the inner pipe 110 maintaining a uniform cross-sectional shape and area, and having a length sufficient to ensure that each liquid has an essentially steady velocity along the common direction 134 as the liquids pass the outlet end 118 of the inner pipe 110.

For the various embodiments, the relative position of the immiscible liquids delivered from the pipe-in-pipe injector 100 may have an influence on whether an emulsion can be formed using the mixing apparatus of the present disclosure. For example, the immiscible liquids delivered from the pipe-in-pipe injector 100 can include a first liquid and a second liquid, where the first liquid has a density that is greater than the density of the second liquid. In an embodiment where the first liquid having the greater density is supplied through the inner pipe 110, according to the embodiments of the present disclosure, an emulsion of the immiscible liquids can be formed. In contrast, when the second liquid having the lesser density is supplied through the inner pipe 110, according to the embodiments of the present disclosure, an emulsion of the immiscible liquids may not necessarily be formed under similar processing conditions (e.g., mass flow rates of the first and second liquids, shear force provided in the mixing zone, temperature, etc.). As such, it is preferred that for any two immiscible liquids delivered from the pipe-in-pipe injector 100 the denser liquid should be delivered via the inner pipe 110.

As illustrated in FIG. 1, the end portions 112 and 116 of outer pipe 108 and the inner pipe 110, respectively, are concentric in that they have the central axis 132 relative their respective inner surface for at least a portion of their length. In an additional embodiment, the end portions 112 and 116 of outer pipe 108 and the inner pipe 110, respectively, can be eccentric, where the end portions 112 and 116 of outer pipe 108 and the inner pipe 110 would share parallel axes relative their respective inner surface for at least a portion of their length.

FIG. 1 illustrates the walls forming the outer pipe 108 and inner pipe 110 as having a circular cross-section shape relative the central axis 132, but other cross-sectional shapes may be employed by the pipe-in-pipe injector 100. For example, the outer pipe 108 and/or the inner pipe 110 could have one of a circular, partially circular, parabolic, elliptical, partially elliptical, polygonal (e.g., rectangular), or combinations thereof, for its cross-sectional shape.

Furthermore, the cross-sectional area of each of the outer pipe 108 and the inner pipe 110 may be the same, or different, depending upon a number of different factors, including the mixing zone 124 provided by the rotor-stator mixer 102, the leading surface 122 of the rotor 104 and/or the composition of each liquid being supplied through the pipes 110 and 112. As discussed herein, however, the immiscible liquids provided through the outer pipe 108 and the inner pipe 110 are not subjected to significant feed inconsistencies prior to entering the mixing zone 124 of the rotor-stator mixer 102. Additionally, it is desirable that the mass flow rates of the immiscible liquids not produce jet flow from the pipe-in-pipe injector 100, or flow such that upon coming into contact the immiscible liquids will substantially mix resulting in feed inconsistencies. As such, there may be cross-sectional areas of the outer pipe 108 and/or the inner pipe 110 that are not desirable for a particular application. In an additional embodiment, a second inner pipe could be used with the inner pipe 110 and the outer pipe 108 when three or more steams of liquids are to be used with the mixing apparatus, where the second inner pipe could be concentric or eccentric with the inner and outer pipes 110 and 108.

The mixing apparatus of the present disclosure can be used to make emulsions for batch, semi-batch and continuous polymerization processes. Examples of such polymerization processes can include, but are not limited to, emulsion polymerization processes, mini-emulsion polymerization processes, dispersion polymerization processes, suspension polymerization processes, and/or other heterophase, radical initiated polymerization processes involving a variety of ethylenically unsaturated monomers dispersed in water with or without an interfacially active species such as a surfactant or a protective colloid. Preferably, the mixing apparatus of the present disclosure can be used to continuously produce monomer emulsions, as discussed herein, that are fed to a reactor used for radical aqueous emulsion polymerization.

Figure 2:
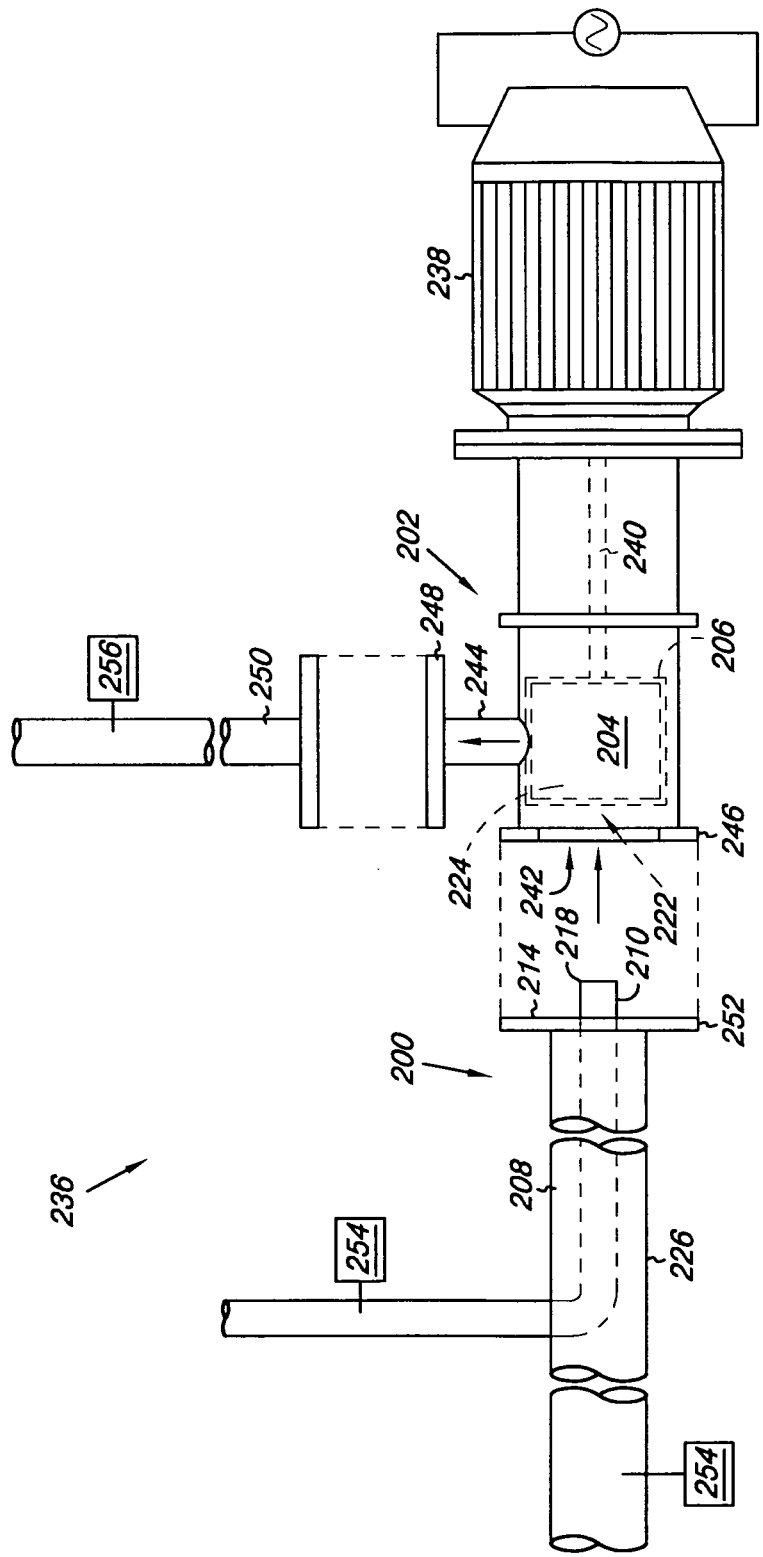
FIG. 2 illustrates a mixing apparatus shown in a partially exploded view according to one embodiment of the present disclosure.

FIG. 2 illustrates a mixing apparatus 236 according to an embodiment of the present disclosure. As illustrated, the mixing apparatus 236 includes a pipe-in-pipe injector 200 and a rotor-stator mixer 202, as discussed herein, shown in a partially exploded view. For the various embodiments, the mixing apparatus 236 can be used to form emulsions from immiscible liquids in ambient operating temperatures of as low as 0° C. and as high as 30° C.

For the various embodiments, the rotor-stator mixer 202 includes a variable speed motor 238 having a rotary drive shaft 240 that supplies power to drive the rotor 204 inside its associated stator 206 of the rotor-stator mixer 202. In one embodiment, the motor 238 is an electric motor.

The rotor-stator mixer 202 also includes a liquid inlet 242 leading to the mixing zone 224 provided by the rotor 204 and the stator 206, as discussed herein, and a liquid outlet 244 leading away from the mixing zone 224. The rotor-stator mixer 202 further includes an inlet flange 246 and an outlet flange 248. For the various embodiments, the outlet flange 248 can be used to physically couple an outlet pipe 250 to the rotor-stator mixer 202, where the outlet pipe 250 can be used to guide an emulsion formed in the rotor-stator mixer 202 to a reactor vessel.

In one embodiment, the pipe-in-pipe injector 200 also includes a flange 252 that allows the pipe-in-pipe injector 200 to be physically coupled to the inlet flange 246 of the rotor-stator mixer 202 in a liquid tight manner. For the various embodiments, the outlet end 214 of the outer pipe 208 has essentially the same cross-sectional shape and size as the liquid inlet 242 of the rotor-stator mixer 202.

The pipe-in-pipe injector 200 is also shown with the outlet end 218 of the inner pipe 210 extending away from the inlet portion 226 of outer pipe 208 and beyond the outlet end 214 of the outer pipe 208. As discussed herein, this allows the inner pipe 210 to extend into the liquid inlet 242 of the rotor-stator mixer 202 to position the outlet end 218 of the inner pipe 210 at the predetermined distance from the leading surface 222 of the rotor 204, as discussed herein.

As will be appreciated by one skilled in the art, a variety of rotor-stator mixers 202 may be used in the mixing apparatus 236 disclosed herein. Examples of such rotor-stator mixers include, but are not limited to, those with toothed rotors and stators and those having a rotor cage type design. Example of these types of rotor-stators include, but are not limited to, those commercially available from Chemineer, Inc., Ika® Werke GmbH & Co., Silverson Machines, Inc. and Kinematica, Inc, among others. Additional examples of suitable rotor-stator mixers may be found in the *Handbook of Industrial Mixing: Science and Practice*, ISBN 0-471-26919-0, J Wiley and Sons, 2004, Chapter 8: Rotor Stator Mixing Devices, which is incorporated herein in its entirety. One specific example of a suitable rotor-stator mixer is the 2 inch Greerco tandem shear rotor-stator pipeline mixer manufactured by Greerco, a division of Chemineer, Inc.

The mixing apparatus 236 can further be associated with process control means for controlling the formation of an emulsion from the rotor-stator mixer 202. For example, process control features of the mixing apparatus 236 can regulate, besides other things, mass flow rates of the immiscible liquids delivered from the pipe-in-pipe injector 200, rotational speed of the rotor 204, and liquid back-pressure formed in the rotor-stator mixer 202, among others.

For example, the mixing apparatus 236 can be associated with a mass flow control unit 254 for monitoring and controlling the mass flow rates of the liquids supplied to the rotor-stator mixer 202 via pipe-in-pipe injector 200. For the various embodiments, the mass flow control unit 254 can include software, application modules, application specific integrated circuit (ASIC) logic, and/or instructions storable in memory and executable by a processor to receive signals from one or more devices and control one or more devices that regulate the mass flow rate of liquids supplied through the outer and inner pipes 208 and 210 to the rotor-stator mixer 202. Examples of such devices include, but are not limited to, liquid pumps, temperature sensors, flow meters (e.g., volumetric flow meters and/or mass flow meters) and adjustable valves.

For the various embodiments, the mass flow control unit 254 can monitor and control the mass flow rate of the immiscible liquids through their respective outer and inner pipes 208 and 210 of the pipe-in-pipe injector 200 to the rotor-stator mixer 202 based on a number input parameters. For example, the mass flow control unit 254 could use temperature readings from the reactor to adjust the mass flow rates of the immiscible liquids delivered through the pipe-in-pipe injector 200.

The mass flow control unit 254 can also be used to provide and maintain a substantially constant feed ratio of the immiscible liquids at a uniform feed rate to the mixing zone 224 of the rotor-stator mixer 202. For example, the mass flow control unit 254 can monitor and control the mass flow rate of a first liquid through the inner pipe 210 and the mass flow rate of a second liquid through the outer pipe 108 at a substantially constant feed ratio of at least 1 to 1. In an additional embodiment, the mass flow control unit 254 can monitor and control the mass flow rate of the first liquid through the inner pipe 210 and the mass flow rate of the second liquid through the outer pipe 108 at a substantially constant feed ratio of at least 3 to 1. Other possible substantially constant feed ratios that the mass flow control unit 254 can monitor and control include, but are not limited to, at least 4 to 1, at least 5 to 1, and about 13.5 to 1. Other substantially constant feed ratios are also possible and will be dependent upon a desired composition of the emulsion produced by the mixing apparatus 236.

The various embodiments can also include a post rotor-stator mixer control unit 256. The post rotor-stator mixer control unit 256 can include software, application modules, application specific integrated circuit (ASIC) logic, and/or instructions storable in memory and executable by a processor to receive signals from one or more devices and control one or more devices that can be used to regulate a liquid back-pressure of the emulsion being formed in the rotor-stator mixer 202. Examples of such devices include, but are not limited to, pressure transducers, adjustable valves, and viscometers.

For the various embodiments, the liquid back-pressure of the emulsion emerging from the liquid outlet 244 side of the rotor-stator mixer 202 and viscosity of the emulsion are process parameters that can be monitored, adjusted and/or maintained using the post rotor-stator mixer control 256. For example, the post rotor-stator mixer control 256 can be used to monitor and adjust the liquid back-pressure of the emulsion to affect the residence time of immiscible liquids in the mixing zone 224 for forming an emulsion and/or be used to indicate the formation of the emulsion. For the various embodiments, viscosity readings in the liquid outlet 244 can also be used to determine when and if an emulsion has been built, its rate of growth and/or the level of emulsion in the mixing apparatus 236.

A desirable liquid back-pressure can have different values for different immiscible liquids, substantially constant feed ratios and flow rates, but should be sufficient to provide that the liquids supplied to the rotor-stator mixer have an adequate residence time within the rotor-stator mixer for emulsification. For some embodiments, it is also possible to have a fixed or predetermined liquid back-pressure value. For some embodiments, a preferred predetermined liquid back-pressure can be in the range of from about 30 psi (pounds/square inch) to about 50 psi.

For the various embodiments, the post rotor-stator mixer control 256 can also be used to control the rotational speed of the variable speed motor 238 coupled to the rotor 204. As appreciated, the rotational speed of the rotor 204 affects the shear stress that the rotor-stator mixer imparts to the immiscible liquids. Generally, the rotational speed of the rotor 204 and the shear stress imparted by the rotor 204 can be adjusted by adjusting the energy input to the rotor-stator mixer such that increased energy results in increased rotational speed and generally increased shear stress. Used in conjunction with a given liquid back-pressure value and/or mass flow rates of the immiscible liquids, changes to the rotational speed of the variable speed motor 238 can be used by the post rotor-stator mixer control 256 to achieve an emulsion from the immiscible liquids.

Shear stress, provided by the rotor-stator mixer 202, may also be dependent to some degree upon the design, components and/or operating conditions of the rotor-stator mixer 202. The desirable rotational speed of a rotor-stator mixer, useful for emulsion generation, can have different values for particular applications and may depend, in part, on variables such as the phase ratio and flow rates of liquids being supplied to the rotor-stator mixer 202, the residence time of the immiscible liquids in the rotor-stator mixer 202, whether a surfactant is included, and when a surfactant is included the type of surfactant employed and the concentration of the surfactant. Adjustment of the rotational speed of a rotor-stator mixer 202 may be used to regulate the liquid back-pressure and/or the viscosity on the liquid outlet 244 side of the rotor-stator mixer 202.

Preferably, a surfactant, as discussed herein, can be used to stabilize the emulsion formed in the rotor-stator mixer 202. For the various embodiments, the surfactant can be dissolved in either of the first liquid or the second liquid. In an additional embodiment, the surfactant could also be feed via an additional nozzle into the mixing zone 224. Preferably, the surfactant is provided along with the denser of the two or more liquids supplied to the mixing zone by the pipe-in-pipe injector 200.

Embodiments of the mixing apparatus 236 can be used forming emulsions from a variety of immiscible liquids. For example, embodiments of the mixing apparatus can be used in forming a continuous monomer emulsion production for a polymerization process. For the various embodiments, the monomer emulsion can be formed from a first liquid and a second liquid, where the second liquid is immiscible with the first liquid and at least one of the first liquid and the second liquid contains monomers. The first liquid and the second liquid also have different densities, where the first liquid has a first density and the second liquid has a second density that is less than the first density.

As discussed herein, the relative positions of the first liquid and the second liquid delivered from the pipe-in-pipe injector 200 can influence the emulsion formation. Preferably, for the various embodiments, the liquid having the greater density should be supplied through the inner pipe 210, and the liquid having the lesser density should be supplied through the outer pipe 208. So, for the present embodiment a continuous stream of the second liquid should be supplied through the outer pipe 208 to surround a continuous stream of the first liquid being supplied through the inner pipe 210. Given this configuration, the first liquid will emerge from the inner pipe 210 surrounded by and flowing in a direction common with the second liquid from the outer pipe 208. An emulsion from the first liquid and the second liquid can then be continuously formed in the mixing zone 224 of the rotor-stator mixer 202.

As discussed herein, the first liquid and the second liquid delivered from the pipe-in-pipe injector 200 can be provided a residence time sufficient to form the monomer emulsion. For the various embodiments, the liquid back-pressure exerted by the monomer emulsion from the rotor-stator mixer 202 can also be adjusted, as discussed herein, to provide the residence time sufficient for forming the monomer emulsion. For the various embodiments, providing the residence time sufficient for the first liquid and the second liquid in the rotor-stator mixer 202 to form the monomer emulsion can also include adjusting the energy input from the rotor-stator mixer 202 to form the monomer emulsion from the first liquid and the second liquid.

As discussed herein, to form the monomer emulsion for the emulsion polymerization process at least one of the first liquid and the second liquid contains monomers. The first liquid and the second liquid are also immiscible liquids, as discussed herein, such as an organic solution and an aqueous solution. For example, the first liquid can be an aqueous solution and the second liquid can be an organic solution having ethylenically unsaturated monomers.

Various monomer emulsions may be produced by supplying the aqueous solution and the organic solution having the ethylenically unsaturated monomers via the pipe-in-pipe injector 200 to the rotor-stator mixer 202. As discussed herein, a substantially constant feed ratio of the immiscible liquids can be provided at a uniform feed rate to the mixing zone 224 of the rotor-stator mixer 202. Generally, forming a monomer emulsion becomes increasingly difficult as the feed ratio of the organic solution to the aqueous solution increases. Surprisingly the disclosed embodiments provide for the formation of a continuous monomer emulsions over a wide range substantially constant feed ratios, as provided herein in a single step. For example, embodiments of the mixing apparatus 236 provided herein are able to form a monomer emulsion from the organic solution and the aqueous solution having a substantially constant feed ratio of at least 3 to 1; at least 5 to 1; and even about 13.5 to 1. Organic solution to aqueous solution substantially constant feed ratios greater than 13.5:1 may also be used for monomer emulsion formation when using the mixing apparatus 236 of the present disclosure.

Embodiments of the mixing apparatus 236 can be used in forming the monomer emulsion for a continuous polymerization process. For the various embodiments, initially forming the monomer emulsion can be accomplished using a start-up technique that has been found to be successful in forming the emulsion for a wide variety of immiscible liquids delivered at a wide variety of substantially constant feed ratios, as discussed herein.

Embodiments of the start-up technique of the present disclosure are in contrast to simply feeding the first and second liquids at their respective uniform feed rate and substantially constant feed ratio to the rotor-stator 202. This approach leads to inconsistencies in producing an emulsion from the first and second liquids. In contrast, embodiments of the start-up technique of the present disclosure have consistently produced and maintained in a steady state manner an emulsion for a wide variety of immiscible liquids delivered at a wide variety of substantially constant feed ratios.

As discussed herein, the relative positions of the first liquid and the second liquid delivered from the pipe-in-pipe injector 200 can influence the emulsion formation. Given that the first liquid has a first density and that the second liquid has a second density that is less than the first density, preferably the continuous stream of the second liquid can be supplied through the outer pipe 208 to surround the continuous stream of the first liquid being supplied through the inner pipe 210. Given this configuration, the first liquid will emerge from the inner pipe 210 surrounded by and flowing in a direction common with the second liquid from the outer pipe 208. An emulsion from the first liquid and the second liquid can then be continuously formed in the mixing zone 224 of the rotor-stator mixer 202.

Initially, the first liquid (e.g., the aqueous solution as discussed herein) can be supplied through the inner pipe 210 to fill the rotor-stator mixer 202 prior to supplying the second liquid (e.g., the organic solution having ethylenically unsaturated monomers) to the rotor-stator mixer 202. In other words, for the start-up technique the first liquid is supplied alone to fill and provide liquid flow through the rotor-stator mixer 202. For the various embodiment, the first mass flow rate used in filling the rotor-stator mixer 202 can be a final mass flow rate (as initially calculated to achieve the desired reaction) for the first liquid in forming the monomer emulsion. In one embodiment, supplying the first liquid at the first mass flow rate to the rotor-stator mixer 202 in conjunction with the post rotor-stator mixer control 256 helps to generate the liquid back-pressure in the rotor-stator mixer 202 prior to supplying the second liquid to the rotor-stator mixer 202.

For the various embodiments, once the first liquid at the first mass flow rate has filled the rotor-stator mixer 202 and the liquid back-pressure has been obtained, the second liquid is supplied to the rotor-stator mixer 202 at a mass flow rate that is below its final mass flow rate (as initially calculated to achieve the desired reaction). For example, the second liquid can be supplied to the rotor-stator mixer 202 at a second mass flow rate that is about fifty percent of the final mass flow rate for the second liquid. Other values for the second mass flow rate of the second liquid are also possible.

For the various embodiments, the mass flow rate of the second liquid can then be increased over a predetermined time interval from the second mass flow rate to the final mass flow rate. For the various embodiments, the predetermined time interval can be about five minutes, about six minutes, or even longer. Other values for the predetermined time interval (e.g., time intervals shorter than about 5 minutes) are also possible. The first liquid and the second liquid delivered from the pipe-in-pipe injector 200 during the start-up technique can be provided a residence time sufficient to form the monomer emulsion, as discussed herein.

As discussed herein, the embodiments of the mixing apparatus can be used in forming a continuous monomer emulsion for a polymerization process. For the various embodiments, the monomer emulsion can be formed from the first liquid and the second liquid, where the second liquid is immiscible with the first liquid and at least one of the first liquid and the second liquid contains monomers.

Examples of such monomers include, but are not limited to, at least one ethylenically unsaturated monomer. Suitable examples of such ethylenically unsaturated monomers include, but are not limited to, ethylene, styrene, or alkyl-substituted styrene; vinyl esters such as vinyl acetate, vinyl isopryl acetate, vinyl propionate, vinyl butyrate, vinyl pivalate, vinyl neo-nonanoate, 2-ethyl hexanoate, vinyl neo-decanoate, vinyl neo-endecanoate, vinyl neo-dodecanoate and mixtures thereof; vinyl halides such as vinyl chloride and vinylidene chloride; (meth)acrylic ester monomers including methyl acrylate, ethyl acrylate, butyl acrylate, 2-ethyl hexyl acrylate, decyl acrylate, lauryl acrylate, methyl methacrylate, butyl methacrylate, isodecyl methacrylate, lauryl methacrylate, hydroxyethyl methacrylate, hydroxypropyl methacrylate; (meth)acrylonitrile; (meth)acrylamide; butadiene; propylene, α-olefins such as 1-decene; vinyl butyrate and other vinyl esters; and monoethylennically unsaturated (meth) acrylic monomers. Examples of monoethylennically unsaturated (meth)acrylic monomers include esters and nitriles of (meth)acrylic acid, such as, for example, $C_1$ to $C_{24}$ alkyl esters of (meth)acrylic acid such as ethyl(meth)acrylate, 2-ethyl hexyl(meth)acrylate, and stearyl(meth)acrylate; hydrophobic branched mono vinyl esters; monomers with hydrolyzable Si-organic bonds that include vinyl silanes, methacryloyloxypropyltrimethoxysilane, methacryloyloxypropyltriethoxysilane, methacryloyloxypropyltripropoxysilane, vinyltrimethoxylsilane, vinyl tris(2-methoxyethoxy silane), and vinyl triisopropoxysilane. The use of the term "(meth)" followed by another term such as acrylate, acrylonitrile, or acrylamide refers to acrylate, acrylonitrile, or acrylamide and methacrylate, methacrylonitrile, and methacrylamide, respectively.

Additional examples of suitable monomers include, but are not limited to, carboxylic acid-containing monomers and anhydride monomers such as acrylic acid, (meth)acrylic acid, crotonic acid, itaconic acid, fumaric acid, maleic acid, monomethyl itaconate, monomethyl fumarate, monobutyl fumarate, and maleic anhydride; sulfur acid containing monomers such as sulfoethyl(meth)acrylate, 2-acrylamido-2-methylpropane sulfonic acid, vinyl sulfonic acid, styrene sulfonic acid, sulfophthalic acid, amino or diamino alkyl or aryl sulfonic acids including 1,4-butanediol-2-sulfonic acid; phosphorus acid containing monomers including phosphoalkyl(meth)acrylate.

Additional examples of suitable monomers also include, but are not limited to, at least one adhesion promoting monomer. Suitable examples of adhesion promoting monomers include, but are not limited to, free-radically polymerizable nitrogen-containing compounds that have at least one of an amino group, an ureido group, a urea group, a thiourea group, and an N-heterocyclic group. Examples of adhesion monomers include ureido (meth)acrylates, amine containing (meth)acrylates such as aminoalkyl(meth)acrylate, and N,N-dialkyl aminoalkyl(meth)acrylate); propyleneimine, (meth) acrylates with at least one of urea and thiourea in the side chains.

Additional examples of suitable monomers also include, but are not limited to, at least one acetoacetate containing monomer. Suitable examples of acetoacetate containing monomers include, but are not limited to, acetoacetoxyethyl acrylate, acetoacetoxypropyl methacrylate, allyl acetoacetate, acetoacetoxybutyl methacrylate, 2,3-di(acetoacetoxy) propyl methacrylate and the like. In general, polymerizable hydroxy functional monomers can be converted to the corresponding acetoacetate by reaction with diketene or other suitable acetoacetylating agent.

For the various embodiments, the first liquid and/or the second liquid may also include one or more of an initiator suitable for initiating emulsion polymerizations, one or more surfactants and/or one or more further additives. Suitable initiators are the initiators known to promote emulsion polymerization and include water-soluble oxidizing agents, such as, organic peroxides (e.g., t-butyl hydroperoxide, cumene hydroperoxide, etc.), inorganic oxidizing agents (e.g., hydrogen peroxide, potassium persulfate, sodium persulfate, ammonium persulfate, etc.) and those initiators that are activated in the water phase by a water-soluble reducing agent. Such initiators are employed in an amount sufficient to cause polymerization. Alternatively, redox initiators may be employed in the polymerization process.

For the various embodiments, a surfactant may also be used in the emulsion formation and/or polymerization reaction of the present disclosure. Useful surfactants include, but are not limited to, anionic, cationic, and/or nonionic emulsifiers such as, for example, alkali metal or ammonium salts of alkyl, aryl, or alkylaryl sulfates, sulfonates or phosphates; alkyl sulfonic acids; sulfosuccinate salts; fatty acids; ethylenically unsaturated surfactant monomers; and ethoxylated alcohols or phenols, among others. As appreciated, the type and amount of surfactant used in the emulsion polymerization reaction will depend on the specific composition, reaction conditions, and the desired final particle size, as is known in the art.

Other ingredients known in the art to be useful for various specific purposes in emulsion polymerization, such as, acids, salts, chain transfer agents, chelating agents, protective colloids, buffering agents, neutralizing agents, pH adjusters, antioxidants, deodorants, biocides, cross-linking agents, dyes, pigments, defoamers and plasticizers, among others, also may be employed in the polymerization reaction.

The emulsion prepared according to the present disclosure may be polymerized in a reactor suitable for this purpose. Such reactors include, for example, stirred reactors, kettle cascades and unstirred reactors, such as tube reactors.

EXAMPLES

The following examples illustrate, but do not limit, various aspects of the present disclosure. It is to be understood that the particular examples, materials, amounts, and procedures are to be interpreted broadly in accordance with the scope of the disclosure as set forth herein. All parts and percentages are by weight unless otherwise indicated. The examples use the following materials.

Monomer Emulsion Components
N-butyl acrylate (ChemPoint, inhibit with 15 parts per million (ppm) of methoxyhydroquinone (MEHQ)).
n-Methyl methacrylate (Lucite International, inhibit with 50 ppm of MEHQ).
Methacrylic acid (Lucite International, inhibit with 200 ppm of MEHQ).
Styrene (The Dow Chemical Company).
2-Ethyl hexyl acrylate (The Dow Chemical Company).
Emulsifiers
Disodium ethoxylated alcohol [C10-C12] half ester of sulfosuccinic acid (The Dow Chemical Company).
Nonyl phenol ethoxylated sulfate, ammonium salt (4EO) (The Dow Chemical Company).
Demineralized water.
Mixing Apparatus Components
Pipe-in-pipe injector: concentric pipes, where the inner pipe has an inner diameter of 0.5 inches (1.27 cm), and the outer pipe has an inner diameter of 1.0 inches (2.54 cm).
Rotor-stator mixer: 2 inch Greerco tandem shear pipeline mixer (manufactured by Greerco, a division of Chemineer, Inc.). Mount the pipe-in-pipe injector to the inlet of the 2 inch Greerco tandem shear pipeline mixer so that the inner pipe of the pipe-in-pipe injector is about 1.2 diameters of the inner pipe diameter from the leading surface of the rotor taken along the central axis extending from the lumen of the inner pipe towards the rotor.

All measurements and procedures for the following Examples were conducted at a room temperature of about 23° C., unless indicated otherwise.
Production of Monomer Emulsion Example 1

A first liquid has mass composition of demineralized water (261 kg) and emulsifier (49 kg). Combine the components of the first liquid in an up-stream vessel prior to supplying them to the mixing apparatus. A second liquid has a mass composition of n-butyl acrylate (409 kg), n-methyl methacrylate (366 kg), and methacrylic acid (12 kg). Combine the components of the second liquid in an up-stream vessel prior to supplying them to the mixing apparatus. The first liquid has a density that is greater than the second liquid.

Fill the rotor-stator mixer of the mixing apparatus with water. After filling the rotor-stator with water set the rotational speed of the rotor to 3,000 revolutions per minute (rpm). Feed the first liquid via the inner pipe of the pipe-in-pipe injector to the mixing zone of the rotor-stator mixer at a mass flow rate of 75 kilograms per hour (kg/h). Feed the first liquid exclusively to the rotor-stator mixer for one minute so that the head of the rotor-stator mixer is filled with the first liquid and the composition of the interior of the mixing chamber is that of the first liquid. Set a back pressure of about 30 to 40 pounds per square inch absolute (PSIA) from the rotor-stator mixer.

One minute after feeding the first liquid to the rotor-stator mixer, feed the second liquid via the outer pipe of the pipe-in-pipe injector concurrently with the first liquid to the rotor-stator mixer. Feed the second liquid at an initial mass flow rate of 90 kg/h, which is 50% of the second liquid final mass flow rate of 180 kg/h.

Linearly increase the mass flow rate of the second liquid from the initial mass flow rate of 90 kg/h to the final mass flow rate of 180 kg/h over a period of 5 minutes. Maintain the second liquid final mass flow rate of 180 kg/h for 260 minutes to achieve a substantially constant feed ratio of 2.4 to 1 (mass flow rate for the second liquid to mass flow rate for the first liquid). Maintain the back pressure from the rotor-stator mixer at about 30 to 40 pounds per square inch absolute (PSIA) to provide a residence time sufficient for the first liquid and the second liquid in the rotor-stator mixer to form a continuous monomer emulsion.

Example 2

A first liquid has 7.2 parts demineralized water (parts are by weight based on 100 parts monomer of the second liquid) and 0.6 parts of disodium ethoxylated alcohol [C10-C12] half ester of sulfosuccinic acid. Combine the components of the first liquid in an up-stream vessel prior to supplying them to the mixing apparatus. A second liquid has 53 parts n-butyl acrylate (parts are by weight based on 100 parts monomer), 11 parts Styrene, 25 parts 2-Ethyl Hexyl Acrylate, 11 parts n-Methyl methacrylate. Combine the components of the second liquid in an up-stream vessel prior to supplying them to the mixing apparatus. The first liquid has a density that is greater than the second liquid.

The procedure for operating the rotor-stator mixer to produce a continuous monomer emulsion from the first and second liquid is as described in Example 1 above. For the given parts by weight, the substantially constant feed ratio of the mass flow rate for the second liquid to the mass flow rate of the first liquid is 13.3 to 1. Maintain the back pressure from the rotor-stator mixer at about 30 to 40 pounds per square inch absolute (PSIA) to provide a residence time sufficient for the first liquid and the second liquid in the rotor-stator mixer to form a continuous monomer emulsion.

Example 3

A first liquid has 25 parts demineralized water (parts are by weight based on 100 parts monomer of the second liquid) and 1 part of nonyl phenol ethoxylated sulfate, ammonium salt (4EO). Combine the components of the first liquid in an up-stream vessel prior to supplying them to the mixing apparatus. A second liquid has 46 parts n-butyl acrylate (parts are by weight based on 100 parts monomer), 2 parts methacrylic acid and 52 parts n-methyl methacrylate. Combine the components of the second liquid in an up-stream vessel prior to supplying them to the mixing apparatus. The first liquid has a density that is greater than the second liquid.

The procedure for operating the rotor-stator mixer to produce a continuous monomer emulsion from the first and second liquid is as described in Example 1 above. For the given parts by weight, the substantially constant feed ratio of the mass flow rate for the second liquid to the mass flow rate of the first liquid is 4 to 1. Maintain the back pressure from the rotor-stator mixer at about 30 to 40 pounds per square inch absolute (PSIA) to provide a residence time sufficient for the first liquid and the second liquid in the rotor-stator mixer to form a continuous monomer emulsion.

Example 4

A first liquid has 45 parts demineralized water (parts are by weight based on 100 parts monomer of the second liquid) and 0.2 parts of nonyl phenol ethoxylated sulfate, ammonium salt (4EO). Combine the components of the first liquid in an up-stream vessel prior to supplying them to the mixing apparatus. A second liquid has 37 parts n-butyl acrylate (parts are by weight based on 100 parts monomer), 2 parts methacrylic acid and 61 parts n-methyl methacrylate. Combine the components of the second liquid in an up-stream vessel prior to supplying them to the mixing apparatus. The first liquid has a density that is greater than the second liquid.

The procedure for operating the rotor-stator mixer to produce a continuous monomer emulsion from the first and second liquid is as described in Example 1 above. For the given parts by weight, the substantially constant feed ratio of the mass flow rate for the second liquid to the mass flow rate of the first liquid is 2.2 to 1. Maintain the back pressure from the rotor-stator mixer at about 30 to 40 pounds per square inch absolute (PSIA) to provide a residence time sufficient for the first liquid and the second liquid in the rotor-stator mixer to form a continuous monomer emulsion.

The invention claimed is:

1. A method of forming a monomer emulsion for a continuous polymerization process, comprising:
    supplying a first liquid at a first mass flow rate to a rotor-stator mixer that has a leading surface through an inner pipe of a pipe-in-pipe injector;
    supplying a second liquid to the rotor-stator mixer through an outer pipe of the pipe-in-pipe injector at a second mass flow rate that is about fifty percent a final mass flow rate for the second liquid, where the second liquid is immiscible with the first liquid and at least one of the first liquid and the second liquid contains monomers;
    increasing the second mass flow rate of the second liquid from about fifty percent the final mass flow rate to the final mass flow rate over a predetermined time interval;
    keeping the first liquid separate from the second liquid until a predetermined distance of about 1.5 to about 0.5 times an inner diameter of the inner pipe away from the leading surface of the rotor; and
    providing a residence time sufficient for the first liquid and the second liquid in the rotor-stator mixer to form the monomer emulsion from the first liquid and the second liquid.

2. The method of claim 1, where the first liquid has a first density, and the second liquid has a second density lesser than the first density of the first liquid.

3. The method of claim 1, where the predetermined time interval is about five minutes.

4. The method of claims 1, including substantially preventing pre-mixing of the first liquid and the second liquid prior to entering a mixing zone of the rotor-stator mixer.

5. The method of claim 1, where providing a residence time sufficient for the first liquid and the second liquid in the rotor-stator mixer to form the monomer emulsion includes adjusting a liquid back-pressure exerted by the monomer emulsion from the rotor-stator mixer.

6. The method of claim 1, where supplying the second liquid to the rotor-stator mixer includes surrounding a continuous stream of the first liquid with a continuous stream of the second liquid.

7. The method of claim 1, where the first liquid is an aqueous solution and the second liquid is an organic solution having ethylenically unsaturated monomers.

* * * * *